United States Patent [19]

Truesdell

[11] Patent Number: 5,346,337
[45] Date of Patent: Sep. 13, 1994

[54] AUTOMATIC TAPPING MACHINE

[76] Inventor: T. Bruce Truesdell, 14010 Shadow Oaks Way, Saratoga, Calif. 95070

[21] Appl. No.: 56,378

[22] Filed: Apr. 30, 1993

[51] Int. Cl.⁵ .................. B23B 35/00; B23B 39/14; B23B 47/26
[52] U.S. Cl. .................... 408/1 R; 74/89; 269/250; 279/157; 408/108; 408/112; 408/237; 408/234; 470/103; 476/67
[58] Field of Search ............... 279/157, 158; 408/1 R, 408/234, 236, 237, 110–112, 103, 108; 470/103; 74/89; 476/67; 269/250, 252, 253

[56] References Cited

U.S. PATENT DOCUMENTS

| | | | |
|---|---|---|---|
| 2,587,520 | 2/1952 | Peplow | 408/236 X |
| 3,348,421 | 10/1967 | Boice | 74/89 |
| 4,248,101 | 2/1981 | Santoro | 74/89 X |
| 4,780,030 | 10/1988 | Zudall | 408/234 X |
| 4,820,087 | 4/1989 | Ikemoto et al. | 408/9 |
| 5,076,740 | 12/1991 | Petrie | 408/59 |
| 5,174,424 | 12/1992 | Eriksson | 192/56 |

FOREIGN PATENT DOCUMENTS 3102555  8/1982  Fed. Rep. of Germany ...... 408/236

Primary Examiner—Steven C. Bishop
Attorney, Agent, or Firm—Robert Samuel Smith

[57] ABSTRACT

An apparatus for cutting threads in holes of fabricated parts including a vertical support shaft supporting at least one arm extended out over the part with a tap coupled to a motor on the end of each of the at least one arm. The arm is supported on the vertical shaft by a joint support which can be rotated around the vertical shaft and slide vertically on the shaft. A spring on the shaft is biased to return the joint support to a rest position. The vertical shaft can also be positioned vertically by virtue of a manually operated friction drive located in the base. These several degrees of freedom enable a user to position a tap in any one of a multiplicity of holes located over a large area of the part. A means and method for securing the tap in the tap chuck is provided.

22 Claims, 3 Drawing Sheets

AUTOMATIC TAPPING MACHINE

BACKGROUND

1. Field of the Invention

This invention relates to aparatus for tapping holes and particularly to a semiautomatic apparatus characterized by reduced risk of breaking the tap, fast and convenient change of tap size and accomodation to tapping holes distributed over a large area of the part.

2. Prior Art and Information Disclosure

Cutting threads in holes in fabricated pans is a critical operation in several respects. First of all, tap breakage occurs frequently because the operation requires applying a large torque to a tap that must have a cross section that is limited by the size of hole being tapped. A typical tapping operation involves screwing the tap into the hole by hand until the operator judges that torque to turn the tap has increased to a point where the tap may break due to accumulation of chips, then he must back up the tap in order to clear the chips before proceeding. The tapping operation is most frequently the last operation being performed in fabricating the pan, so that, if the tap breaks leaving pan of the tap in the pan, then the pan may have to be scrapped or removed by an expensive tap removal process.

In view of these difficulties, a number of apparatus have been developed to facilitate the tapping process.

One approach has been to install for the tapping operation a tap chuck mounted in a mill or drill press in which the tap is turned in the clockwise direction to advance the tap when the operator forces the tap toward the part then turns in the counterclockwise direction to withdraw the tap when the operator forces the tap away from the hole.

Tap chucks have also been disclosed which have a clutching action which allows the tap to slip if the torque applied to the tap is excessive.

For example, U.S. Pat. No. 5,174,424 to Eriksson is for a tapping head of the type having a clutch between the driver and the driven members of the machine which is adjustable to prevent application of excessive torque as described above.

U.S. Pat. No. 5,076,740 to Petrie discloses an axially telescopic tapper including a fixed part adapted to be held in a machine spindle and a movable pan having limited axial displacement.

U.S. Pat. No. 4,820,087 to Ikemoto is for a tap drive unit to be installed in a mill spindle and includes a drive member attached to the main spindle of a mill and a guide member with a tap holder screwed into one end and clutching connection to the driver at the other end.

All of these approaches require that the operator operate the mill to position the tap accurately in line with the hole and this is a time consuming procedure. Furthermore, the disclosed chucks are characterized by complex construction that is expensive and complicated compared to the present invention.

THE INVENTION

OBJECTS

It is an object of this invention to provide an apparatus for cutting threads in holes of fabricated parts that is characterized by convenience, speed, and reduced frequency of tap breakage.

It is another object that the apparatus provide to the operator the capability to change taps very quickly and conveniently compared to the devices of the prior art.

It is another object to tap holes that are distributed over a large area of the pan without having to spend the time that is normally required to position the spindle of a mill accurately over each hole to be tapped.

It is another requirement that the part can be quickly repositioned in a vise to provide access for tapping holes in various areas of the part.

It is another object to provide a means for supporting the tap which is characterized by minimal runout thereby reducing the stress on the tap.

It is another object to support the tap in a tap chuck by a method such that torque applied in turning the tap will not exceed a predetermined value.

SUMMARY

This invention is directed towards a tapping head coupled to a motor slidably supported on a cantilevered arm that may be manually positioned over a wide area of a pan that is secured in a quick release vice. Vertical position of the tap is first set approximately by a manual friction drive to position a vertical shaft supporting the cantilevered arm. The tap is then manually moved into and out of the tapped hole by virtue of the cantilevered arm being slidably spring loaded onto the vertical shaft.

The shank of the tap is secured in the collapsible sleeve of a chuck in which force of holding the tap by the sleeve is preset such that, if torque on the tap exceeds a preset value, the tap will turn in the chuck and will not break. The chuck is journalled into the support slidably positioned on the cantilevered arm so that run out of the tap is minimized.

DRAWINGS

DESCRIPTION OF THE BEST MODE

Figure 1:
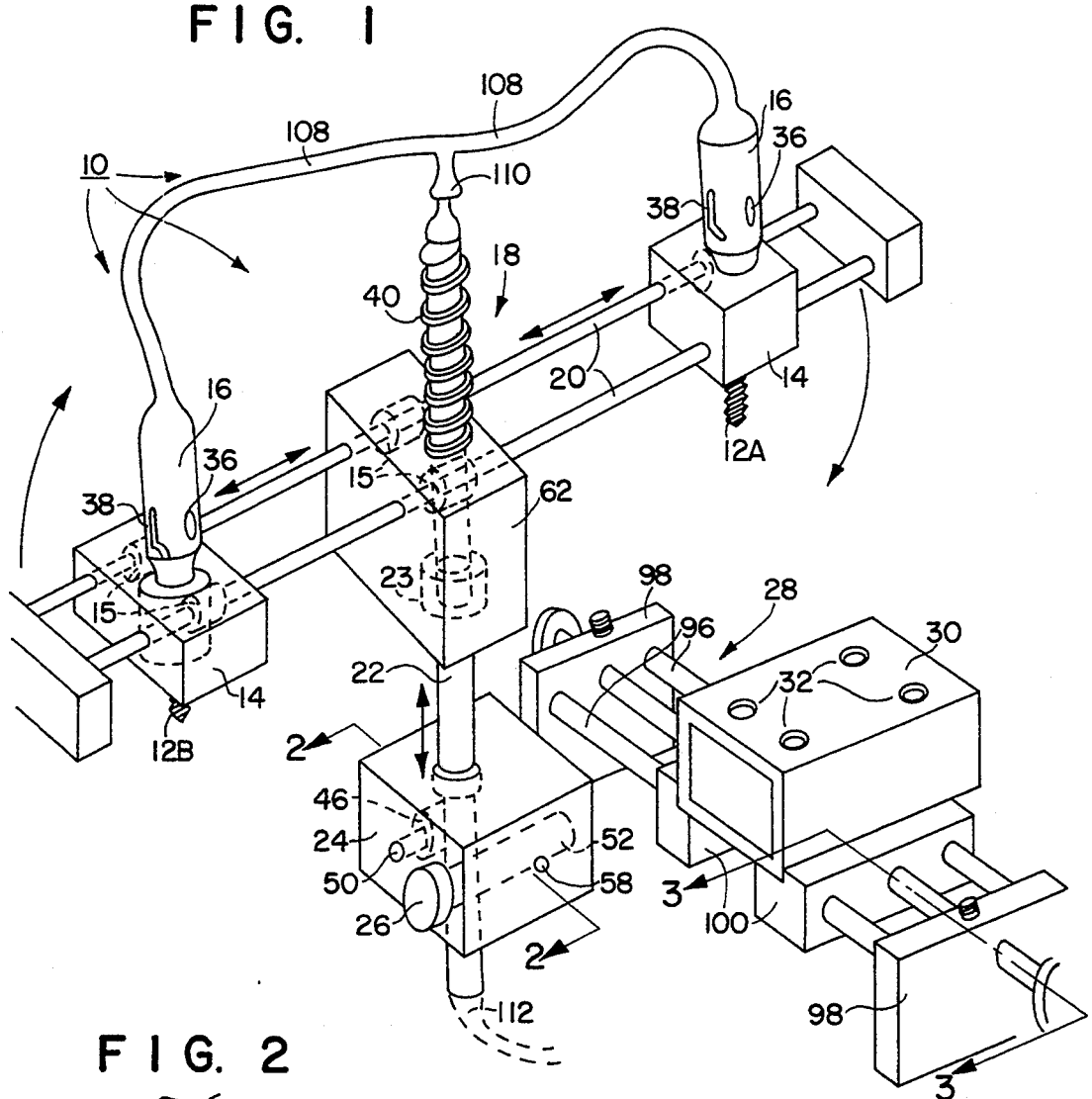
FIG. 1 is an assembly view of the tapping machine of this invention.

Turning now to a discussion of the drawings, FIG. 1 shows in perspective an assembly view of the automatic tapping machine 10 with two taps 12, each secured in a tap chuck 14 respectively. Each tap chuck 64 is also coupled to an air motor 16 and the tap chucks are supported on opposite ends of an arm assembly 18.

The tap chuck 64 is secured in a tap support 14 close to the tap 12. This arrangement is characterized by less run out of the tap 12 compared to an arrangement where the support 14 is secured to the air motor 16.

Figure 4:
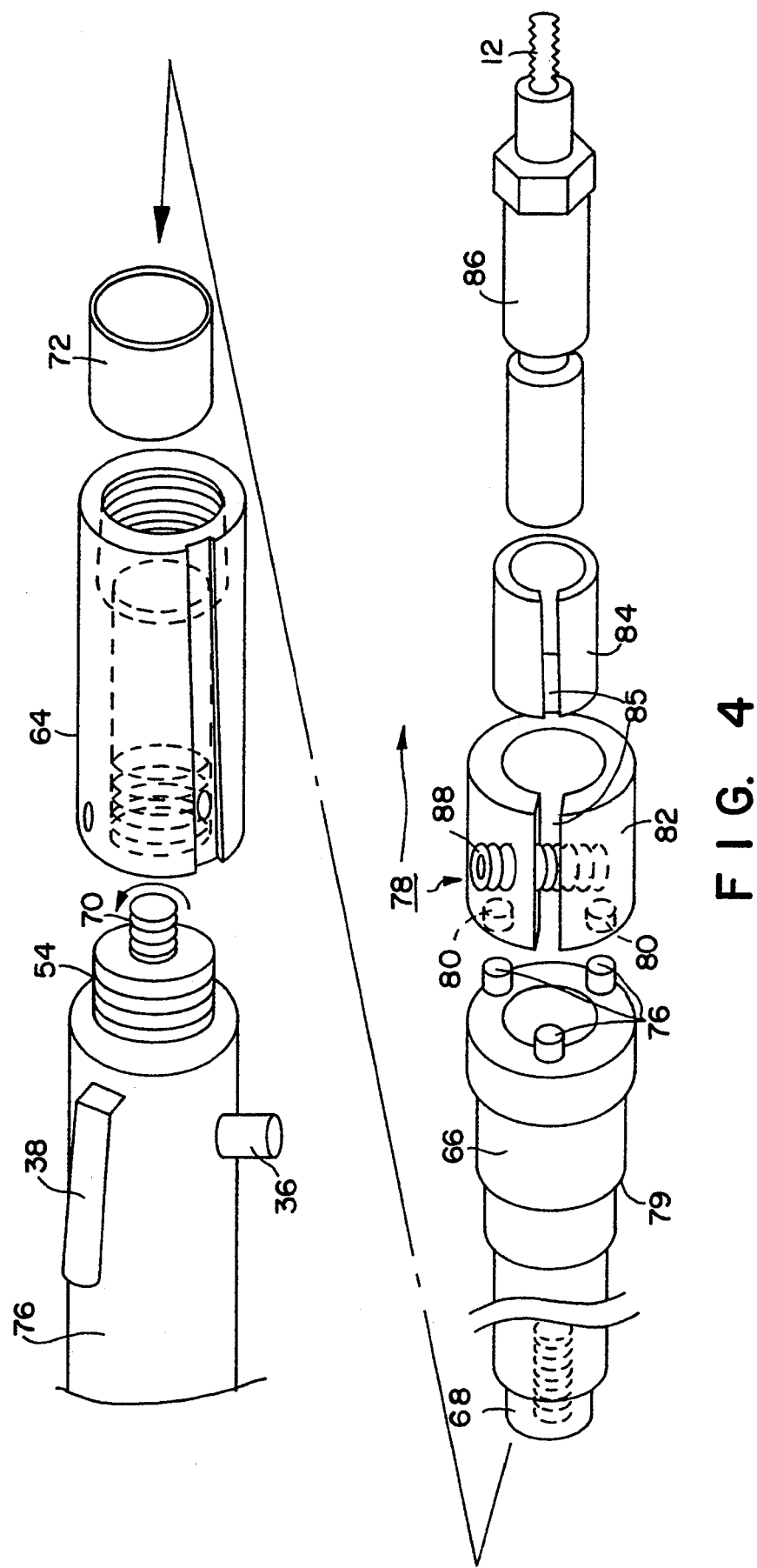
FIG. 4 shows details of the tap chuck.

Details of the tap chuck 14 are shown in the exploded view of FIG. 4. The air motor 16 with power switch 38 and reversing button 36 (for reversing direction of rotation) are shown. The motor housing has a threaded end 54 that screws into one end of chuck housing 64. A coupler 66 is rotatably positioned inside chuck housing 64 and has a threaded end 68 screwed onto the motor spindle 70. The chuck housing 64 has a bushing 72 to engage shoulder 74 in the coupler 66. The coupler 66 has three studs 76 extending axially fom its end to detachably engage holes 80 in tap holder 78. Tap holder 78 is withdrawn from the tapping machine 10 when it is required to change the tap 12. The tap holder 78 includes collapsible holder housing 82, with liner 84 which fits slidably over tap holder 86 into which the tap 12 is inserted.

Compressed air is supplied to each motor 16 through an air line 108 which includes Tee connection 110 on the top end of a bore through vertical shaft 22 and a rotatable connection 112 on the lower end of the vertical shaft 22.

The holder housing 82 and liner 84 have slots 85 providing that tightness of the holder housing 82 on the shank of tap holder 86 is adjustable by turning screw 88. The tightness is adjusted to a desired value such that, if the tap 12 in the hole 32 to be threaded starts to bind, (e.g., due to accumulation of chips or insufficient lubrication) then the tap holder 86 will turn (slip) in the holder housing 82 preventing the tap 12 from breaking.

Figure 5:
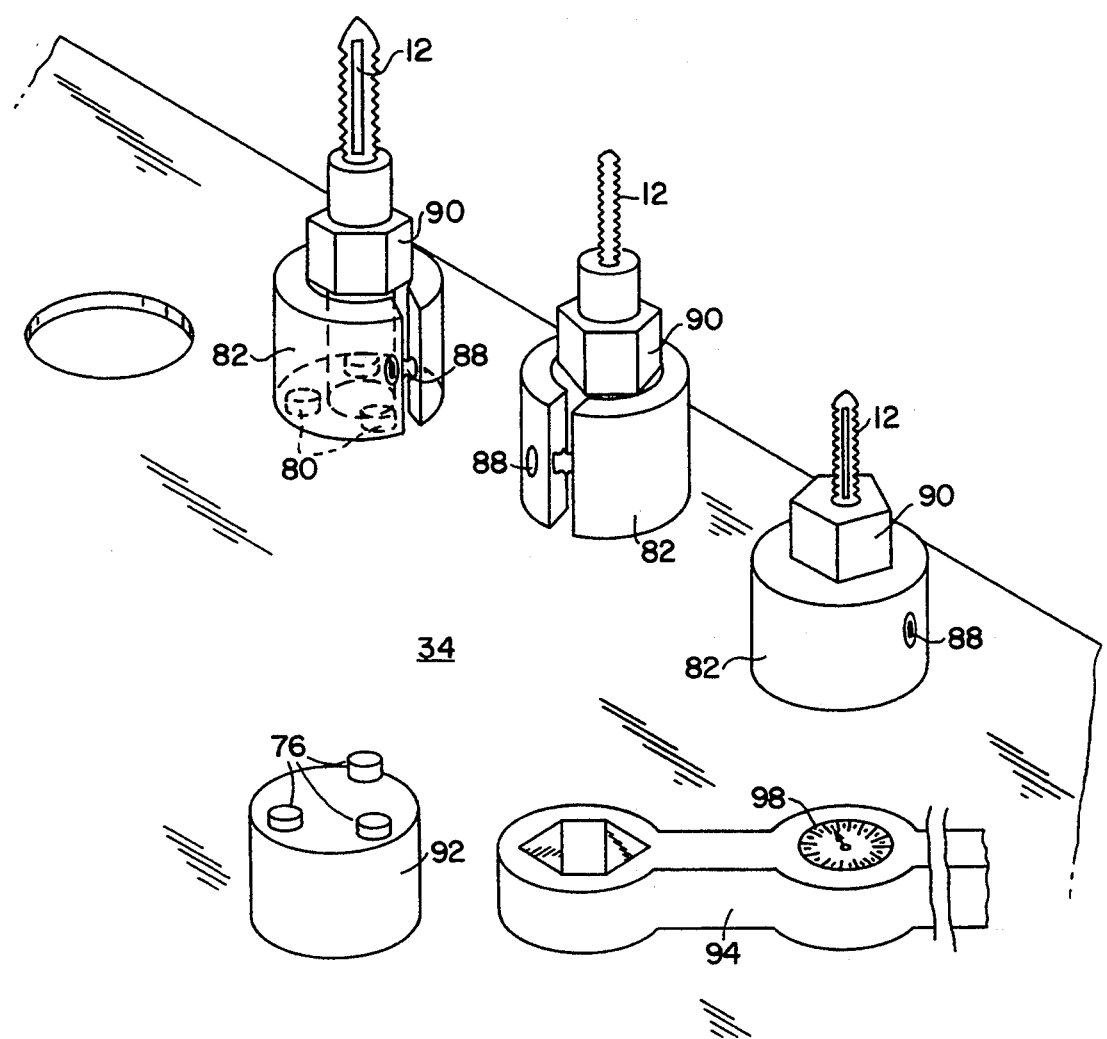
FIG. 5 shows the arrangement for adjusting slip of the tap in its chuck.

FIG. 5 shows the means for tightening the holder housing 82 with slotted liner 84 onto the shank of tap holder 86. The taps 12 secured in their respective holder housing 82 are stored in a row in receptacles (holes) in the work table 34. A mounting plug 92 is also secured to the work table 34 and has three studs 76 on its top surface which mate with three holes 80 on the end of the holder housing 82. In order to tighten the holder housing 82 by a prescribed amount onto tap holder 86, the holder housing 82 with tap holder 86 and tap 12 is mounted onto plug 82 with the holes 80 of the holder housing 82 engaging the studs 76 on plug 92. Then torque wrench 94 is engaged with hex 90 and torque is applied to the torque wrench 94. Set screw 88 is adjusted until the maximum torque that can be read on torque indiactor 98 equals a desired value corresponding to the size of the tap. 12 Now when that tap is used in the tapping apparatus 10, the tap holder 86 will slip in housing holder 82 if torque applied in the tapping operation exceeds the specified value.

Arm assembly 18 includes two parallel rods 20 which are slidably mounted in linear bearings 15 in a junction support 62. The tap chuck supports 14 are journalled by linear bearings 15 (shown in phantom) to slide on parallel rods 20. Vertical shaft 22 is journalled by a linear bearing 23 (in phantom) into junction support 62 so that the junction support 62 can slide up and down and rotate on vertical shaft 22. Therefore each tap 12 can be positioned over any hole 32 in the part 30 anywhere horizontally and vertically by sliding the rods 20 on their linear bearings 15 in junction support 62, by rotating the junction support 62 about the vertical shaft 22, and by sliding junction support 62 up and down on the vertical shaft 22.

Vertical shaft 22 can be vertically positioned in base support 24 by manually turning knob 26 located in base support 24 which is permanently mounted on work table 34. Rotation of knob shaft 52 drives vertical shaft 22 vertically by friction contact.

Figure 2:
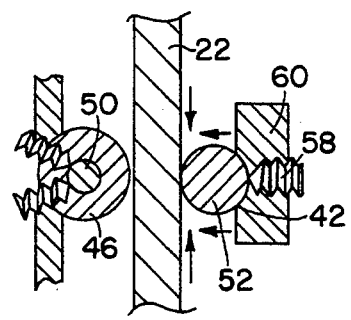
FIG. 2 is a sectional view of the frictional drive for the vertical shaft.

FIG. 2 is a sectional view taken along line of sight 2—2 in FIG. 1 showing details of the friction drive actuated by turning knob 26 to move the vertical shaft 22. FIG. 2 shows the vertical shaft 22 in contact on one side with the the knob shaft 52 and on the other side with the outer race of bearing 46 which is mounted on bearing shaft 50.

Two set screws 48 against bearing shaft 50 pushes the vertical shaft 22 with a total force against knob shaft 52. The reactionary force on knob shaft 52 is exerted partly by the conforming groove 52 in the wall of support base 60. and partly by the set screw 58. Set screw 58 is adjusted to distribute the total reactionary force between the set screw 58 and the conforming groove 52 to enable the set screw 58 and groove 42 to keep the vertical shaft 22 from dropping under gravitaional force when no torque is applied to the knob 26.

Although I do not wish to be bound by theory, I believe that the required settings of set screws 58, and 48 to keep the vertical shaft 22 from slipping downward under gravity when no torque is applied to the knob 26 yet generate sufficient frictional force between the knob shaft 42, groove 52 and vertical shaft 22 to raise the vertical shaft 22 by turning the knob satisfy the equations:

$$f1 = RF$$

$$f2 = (1-R)F$$

$$Mg = Fu' = f1 \times u1 + f2 \times u2$$

where M is the mass of the vertical rod, F is the total force exerted against either side of the vertical rod that is adjusted by adjusting set screws 48, g is gravity, f1 is the force exerted by set screw 58 against the knob shaft, f2 is the force exerted by the conforming groove 52 against the knob shaft 52, R is a proportionality constant that is adjusted by adjusting the set screw 58. When these equations are satisfied by adjustments of the set screws, the minimum torque applied to the knob 26 is required in order to raise the vertical shaft 22.

Figure 3:
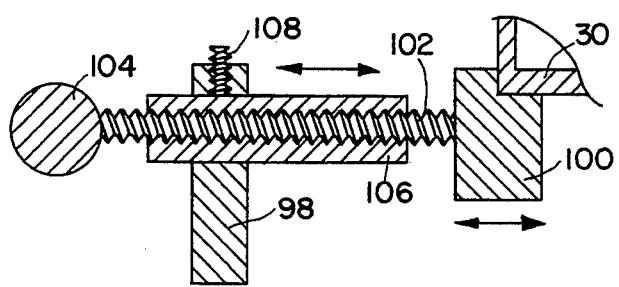
FIG. 3 is a sectional view of one end of the vise.

A part 30 with holes 32 to be tapped is secured in vise 28 which is supported on work table 34. Details of the vise 28 are shown in FIGS. 1 and 2. FIG. 1 shows two parallel slide rods 96 extending between two vise bases 98. Two jaws 100 slide on rods 96. As shown to best advantage in FIG. 3, a threaded rod 102 has a knob 104 on one end and abuts jaw 100 on the other end and screws through a sleeve 106. The sleeve 106 is slidably positioned in vise base 98 and secured in its position by set screw 108. Securing the part 30 in the vise involves pushing the knob 104 to slide the jaw 100 into supportive contact with the part 30. Then, set screw 108 is tightened thereby securing the sleeve. Finally, knob 104 is turned to rotate threaded rod 102 and tighten the jaw 100 against the part 30.

The tapping machine 10 shown in FIG. 1 is thus understood to enable a user to grasp air motor 16A and manually position the tap 12A over any one of the holes 32 by sliding the tap support 14 on rods 20 and rotating the cantilevered rods 20 about vertical shaft 22. The switch 38 is pressed to turn on air motor 16. Then the rotating tap 12A is plunged into the selected hole 32. By pressing a button 36 on the side of the motor, the operator may reverse the direction of rotation of the tap 12 A and thereby withdraw the tap from the tapped holf 32. A different size tap 12B may be secured at the other end of the cantilevered arm enabling the user to conveniently swing the arm 18 around to tap other holes 32 requiring a different thread size.

Major features of this invention include a novel cantilevered arm supporting two taps and enabling the user to manually position either one of two taps in holes located over a wide area of the part. A mechanism for raising and lowering a vertical support shaft of the cantilevered arm is characterized by the ability to optimally adjust the frictional forces that move the shaft and maintain it in a fixed position when required. The arrangement for chucking the tap provides minimal runout of the tap and a means for minimizing tap breakage. Other uses of the features of this invention and modifications incorporating the principles of the invention will occur to the reader after reading the specification and studying the drawings.

For example, the cantilevered arm could extend only from the vertical support rod to the tap chuck and include only one tap chuck. The cantilevered arm may include two or more cross arms supporting four or more tap chucks. The vertical shaft 22 may have an attached pinion and be driven by a pinion gear in place of the friction drive. The arm assembly may be fixed at its center to the joint support and the tap chuck or chucks could be journalled by linear bearings on the arm assembly. The motors may be electric motors rather than air driven motors.

I therefore wish to define the scope of my invention by the appended claims and in view of the specifiation if need be.

I claim:

1. An apparatus for cutting threads in a plurality of holes in various locations of a part, which apparatus comprises:
   a base member adapted for securing to a work surface;
   a tap chuck means adapted for coupling at least one tap to a motor;
   a chuck support means for supporting said tap chuck;
   a first shaft member having a first shaft section engaged with said base member and a second shaft section;
   a joint support member mounted on said second section such as to slide on said second section and rotate around said second section;
   a second shaft member secured through said joint support member substantially intermediate between ends of said second shaft member and perpendicular to said first shaft member; and one of said at least one said chuck support means slidably mounted on said second shaft member between said joint support member and one end of said second shaft member and another one of said at least one said chuck support means slidably mounted on said second shaft member between another end of said second shaft member and said joint support member, said chuck support means adapted such that either one of two taps, one tap secured in one said tap chuck means and driven by said motor respectively, rotates about a center line substantially parallel to said first shaft respectively and providing that an operator may manually guide either one of said rotating taps to a hole to be tapped by sliding said chuck support means on said second shaft member and sliding and rotating said joint support on and about said first shaft member.

2. An apparatus as in claim 1 which comprises a vise means adapted for temporarily securing said part in a position accessible to said chuck means.

3. An apparatus—as in claim 1—comprising spring return means mounted on said first shaft means biased for returning said joint support to a rest location on said second section of said first shaft member thereby assisting said operator in accessing said tap to each of said holes.

4. An apparatus as in claim 1 which comprises a motor coupled to said tap chuck.

5. An apparatus as in claim 4 wherein said motor is an electric motor.

6. An apparatus as in claim 4 wherein said motor is an air motor.

7. An apparatus as in claim 1 wherein:
   said motor is an air motor; and
   said first shaft member is a tube with a bore; and
   said apparatus comprises a first flexible conduit connecting an upper end of said bore to each said motor and a second flexible conduit having one end connected to a lower end of said first shaft member and a second end adapted for connection to a source of pressurized air.

8. An apparatus for cutting threads in a plurality of holes in various locations of a part, which apparatus comprises:
   a base member adapted for securing to a work surface;
   a chuck housing having an end adapted for securing to a housing of a motor;
   a coupling rotatably positioned in said chuck housing and having one end secured to a spindle of said motor and another end;
   a tap holder adapted on a first end for securing a tap;
   a sleeve means for detachable engagement with said another end of said coupling and for receivingly engaging a second end of said tap holder;
   said sleeve having a slot extending axially and a set screw means for adjusting the width of said slot and thereby providing adjustment of tightness of said sleeve on said receivingly engaged second end of said tap holder;
   a chuck support means for supporting said tap chuck;
   a means supported by said base for manually cantilevering said chuck support means to engage said at least one tap with each of said plurality of holes.

9. A method for securing a tap for a tapping operation in which torque to the tap cannot exceed a predetermined value above which, the tap would break, said method including the steps:
   (a) positioning said tap in a tap chuck, said tap chuck comprising:
      (i) a housing having an end adapted for securing to a housing of a motor;
      (ii) a coupling having one end adapted for securing to a spindle of said motor and another end;
      (iii) a tap holder adapted on a first end for securing a tap;
      (iv) sleeve means for engagement with said another end of said coupling and for receivingly engaging a second end of said tap holder;
      (v) said sleeve means having a slot extending axially and a set screw means for adjusting the width of said slot and thereby adjusting tightness of said sleeve on said receivingly engaged second end of said tap holder;
      (vi) said tap holder having means for engaging a torque wrench such that applying torque to said torque wrench tends to rotate said tap holder about its centerline;
   (b) securing said sleeve to a fixed base;
   (c) turning said tap holder with said torque wrench and simultaneously adjusting said set screw means such that when an indicator on said torque wrench indicates a predetermined value of applied torque corresponding to the strength of the tap, said tap holder will slip in said sleeve.

10. An apparatus for cutting threads in a plurality of holes in various locations of a part, which apparatus comprises:

a base member adapted for securing to a work surface;
a tap chuck means adapted for coupling at least one tap to an air motor;
a chuck support means for supporting said tap chuck;
a tube with a bore having a first tube section engaged with said base and a second tube section;
a joint support member journalled slidably mounted on said second tube section providing that said joint support will slide on said second tube section and rotate around said second tube section,
a second shaft member secured to said joint support member substantially perpendicular to said tube with a bore; and
said chuck support means slidably mounted on said second shaft member between an end of said second shaft member and said joint support such that a tap secured in said tap chuck means and driven by a motor rotates about a centerline substantially parallel to said first shaft, and providing that an operator may manually guide said rotating tap to a hole to be tapped by sliding said chuck support means on said second shaft member and sliding and rotating said joint support on and about said first shaft member
a first flexible conduit connecting an upper end of said bore to said motor and a second flexible conduit having one end connected to a lower end of said tube with a bore and a second end adapted for connection to a source of pressurized air.

11. An apparatus for cutting threads in a plurality of holes in various locations of a part, which apparatus comprises:
a base having a block member and a drive means located in said block member;
said base adapted for securing to a work surface;
a tap chuck means adapted for coupling at least one tap to a motor;
a chuck support means for supporting said tap chuck;
a cantilevering means including a first shaft member having a top section supporting means for supporting said chuck support means and a bottom end section;
a drive means located in said block member and receivingly engaging said bottom end section for vertically positioning said first shaft member such as to permit cantilevering said chuck support means to engage said at least one tap with each of said plurality of holes.

12. An apparatus as in claim 13 wherein:
said block member has a cylindrical hole extending from one side to an opposite side of said block member having a diameter selected to slidably receive said bottom end section of said first shaft member; and
said drive member comprises:
a bearing mounted on a bearing shaft in said block, said bearing shaft oriented perpndicular to said cylindrical hole and positioned such that bearing abutts a surface on one side of said first section of said first shaft member;
a set screw means for applying force against said bearing shaft such that force is applied by said beating against said first shaft member;
a friction shaft rotatably mounted in a second hole in said block perpendicular and tangent to said bottom section of said first shaft member;
knob means for rotating said friction shaft;
set screw means for distributing exerting force on said friction shaft toward said bottom section of said first shaft member.

13. An apparatus as in claim 11 which comprises a vise means adapted for temporarily securing said part in a position accessible to said chuck means.

14. An apparatus as in claim 11 comprising spring return means mounted on said first shaft means biased for returning said joint support to a rest location on said second section of said first shaft member thereby assisting said operator in accessing said tap to each of said holes.

15. An apparatus as in claim 11 which comprises a motor coupled to said tap chuck.

16. An apparatus as in claim 15 wherein said motor is an electric motor.

17. An apparatus as in claim 15 wherein said motor is an air motor.

18. An apparatus as in claim 11 wherein:
said motor is an air motor; and
said first shaft member is a tube with a bore; and
said apparatus comprises a first flexible conduit connecting an upper end of said bore to each said motor and a second flexible conduit having one end connected to a lower end of said first shaft member and a second end adapted for connection to a source of pressurized air.

19. A friction drive which comprises:
a block member having a cylindrical hole extending from one side to an opposite side of said block member having a diameter selected to slidably receive said bottom end section of said first shaft member;
a bearing mounted on a bearing shaft in said block member, said bearing shaft oriented perpndicular to said cylindrical hole and positioned such that said bearing abuts a surface on one side of said first section of said first shaft member;
a set screw means for applying force against said bearing shaft such that force is applied by said bearing against said first shaft member;
a friction shaft rotatably mounted in a second hole in said block perpendicular and tangent to said bottom section of said first shaft member;
knob means for rotating said friction shaft;
set screw means for exerting controllable force on said friction shaft toward said bottom section of said first shaft member.

20. A method for tapping a plurality of holes in an area of a part which comprises:
(a) securing said part in a vise accessible to an apparatus for cutting threads in a plurality of holes in various locations of a part, which apparatus comprises:
(i) a base;
(ii) a tap chuck means adapted for coupling at least one tap to a motor;
(iii) a chuck support means for supporting said tap chuck;
(iv) a means supported by said base for manually cantilevering said chuck support means to engage said at least one tap with each of said plurality of holes;
(b) securing a tap in said tap chuck means;
(c) manually cantilevering said tap over each said hole and inserting said tap in each said hole while rotating said tap such as to cut a thread in each hole.

21. An apparatus for cutting threads in a plurality of holes in various locations of a part, which apparatus comprises:
- a base member adapted for securing to a work surface;
- a tap chuck means adapted for coupling at least one tap to a motor;
- a chuck support means for supporting said tap chuck;
- a means supported by said base for manually cantilevering said chuck support means to engage said at least one tap with each of said plurality of holes;
- two vise base members adapted for securing to a work station, and separated by a space from one another;
- two parallel rods, each having one end secured in one vise base and another end secured in said other vise base;
- a pair of jaws slidably mounted on said parallel rods;
- a pair of tubes, each having a threaded interior bore extending from one end of said respective tube to an opposite end;
- each said vise base having a cylindrical hole through said base parallel to and between said rods and each said tube slidably positioned in said one of said cylindrical holes respectively;
- a set screw means for securing said tube at a required location in said cylindrical hole respectively;
- a pair of threaded rods, each threaded rod screwed through said one of said tubes such that a first end of said threaded rod abuts one of said jaws respectively and a second end of said threaded rod is accessible for manually turning said threaded such that a part is secured in said vise means by placing the part between said jaws with each said jaw slid against said part with said first end of each threaded rod abutting its respective jaw, tightening each set screw means thereby securing each tube, turning said threaded rod against said respective jaw thereby securing said part between said jaws.

22. A vise which comprises:
- two vise base members adapted for securing to a work station, and separated by a space from one another;
- two parallel rods, each having one end secured in one vise base and another end secured in said other vise base;
- a pair of jaws slidably mounted on said parallel rods;
- a pair of tubes, each having a threaded interior bore extending from one end of said respective tube to an opposite end;
- each said vise base having a cylindrical hole through said base parallel to and between said rods and each said tube slidably positioned in one of said cylindrical holes;
- a set screw means for securing said tube at a required location in said cylindrical hole respectively;
- a pair of threaded rods, each threaded rod screwed through said one of said tubes such that a first end of said threaded rod abuts one of said jaws respectively and a second end of said threaded rod is accessible for manually turning said threaded rod such that a part is secured in said vise means by placing the part between said jaws with each said jaw slid against said part with said first end of each threaded rod abutting its respective jaw, tightening each set screw means thereby securing each tube, turning said threaded rod against said respective jaw thereby securing said part between said jaws.

* * * * *